June 17, 1947.　　　J. H. BROADBENT　　　2,422,180
ANTENNA POSITIONING CONTROL
Filed June 8, 1943　　　3 Sheets-Sheet 1

WITNESSES:
Leon M. Garman

INVENTOR
John H. Broadbent.
BY
Paul E. Friedemann
ATTORNEY

June 17, 1947. J. H. BROADBENT 2,422,180
ANTENNA POSITIONING CONTROL
Filed June 8, 1943 3 Sheets-Sheet 2

WITNESSES:
Leon M. Garman

INVENTOR
John H. Broadbent.
BY
Paul E. Friedemann
ATTORNEY

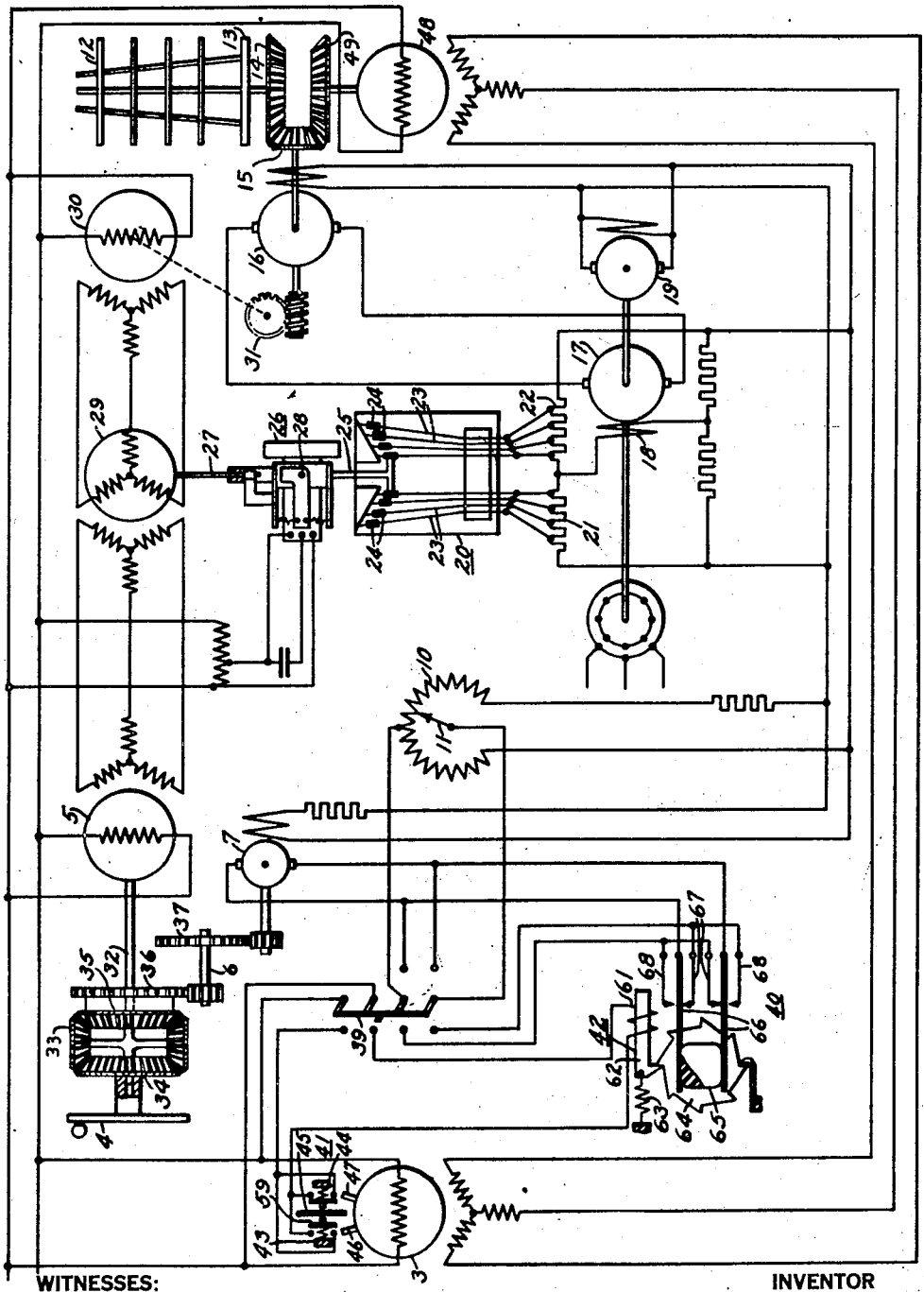

Patented June 17, 1947

2,422,180

UNITED STATES PATENT OFFICE 2,422,180

ANTENNA POSITIONING CONTROL

John H. Broadbent, Longmeadow, Mass., assignor to Westinghouse Electric Corporation, East Pittsburgh, Pa., a corporation of Pennsylvania Application June 8, 1943, Serial No. 490,045

21 Claims. (Cl. 172—239)

This invention relates to apparatus for regulating the position of a rotatable antenna, and, more particularly, to mechanism for causing the antenna to automatically sweep a given sector in azimuth, the size and position of which may be readily adjusted in space.

This invention is an improvement upon the apparatus shown and described in the copending application of C. R. Hanna and E. R. Wolfert, Serial No. 481,190, filed March 31, 1943, entitled Position regulators.

In the said copending application, there is shown a follow-up drive by which the position of a rotatable antenna may be regulated from a remote location, and in which the follow-up control elements are effective to provide a regulating force which is both proportional to the amount of displacement between a control element and an element, the position of which is being regulated, and to the velocity at which the displacement between such elements is changing. In the arrangement there shown, the position of the regulated element may be changed in accordance with changes in position of a manually operable rotatable element, or in accordance with the rotation of an element which is power driven at varying speeds. The improvements provided by this invention are directed to apparatus which cooperates with the power driven rotatable element of the said copending application, and are effective to automatically reverse the movement of such power driven element when the antenna is moved to predetermined positions in azimuth so as to effect movement of the antenna back and forth in an arcuate path to sweep a given sector in azimuth.

One of the principal objects of this invention is to provide a drive for a rotatable antenna which is effective to automatically reverse the movement of the antenna as it is moved to either end of an arcuate path to thereby automatically sweep a given azimuthal sector with the antenna.

A further object is to provide apparatus of the character referred to in which the size and location of the sector being swept may be readily adjusted.

A further object is to provide such apparatus in which the means for adjusting the size and location of the sector being swept is remotely located from the antenna.

Other objects and advantages of the invention will become apparent from the following description and accompanying drawings, in which:

Fig. 6 is a sketch diagrammatically illustrating the essential parts of apparatus constructed in accordance with the principles of this invention.

Figure 1:
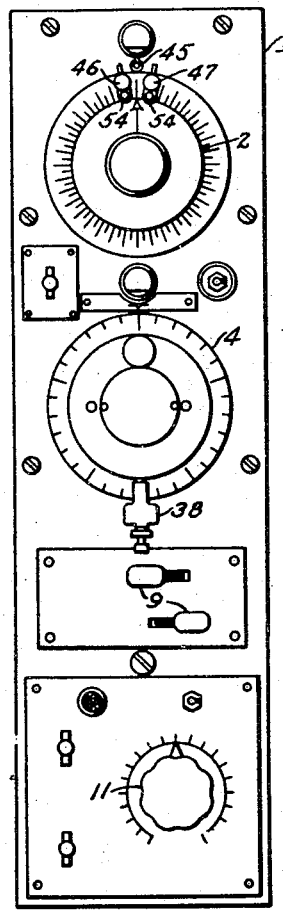
Figure 1 is a front elevational view of a control unit for remotely regulating the position of a rotatable antenna.
Figure 2:
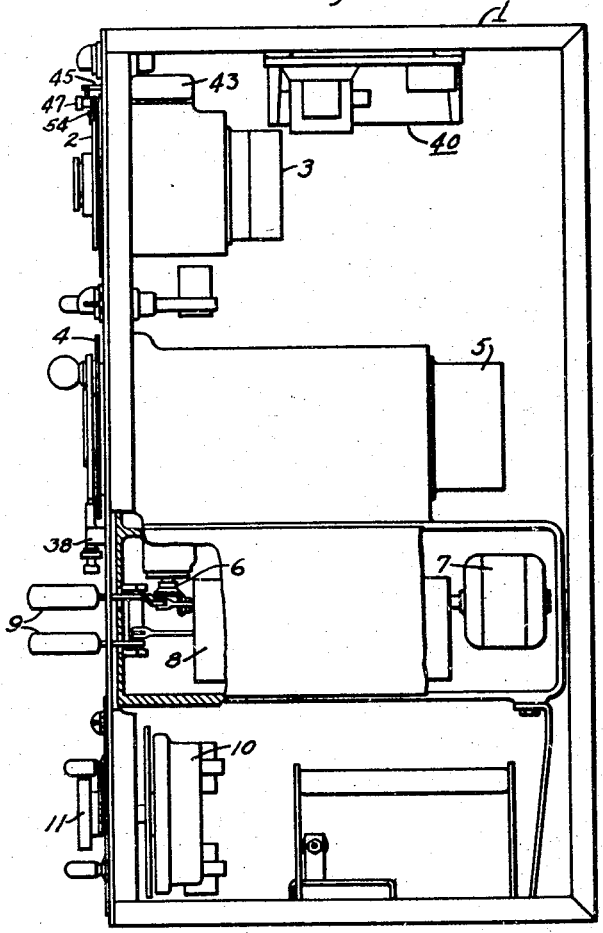
Fig. 2 is a side elevational view of the control unit shown in Fig. 1, a part of the housing being removed and broken away to show the location and arrangement of the various control devices therein.

Referring to Figs. 1 and 2 of the drawings, the numeral I designates as a whole a control housing containing the essential elements by which the position of a remotely located antenna may be controlled. A rotatable indicating dial 2 is mounted on the face of the housing I for indicating the angular position in azimuth of a remotely located antenna, and is driven by a receiver element 3 of a synchro-tie system connected to the antenna in a manner to be described. A manually operable vernier dial 4 is also mounted on the face of the housing I, and is operable to change the position of a transmitter element 5 of a synchro-tie system which is employed for changing the position of the antenna in azimuth in a manner to be described. The position of the transmitter element 5 may also be changed by rotation of a shaft 6 driven by gearing operated from a variable speed motor 7 and a speed change transmission 8. Control levers 9 for changing the setting of the mechanical speed change transmission 8 are mounted on the face of the housing I. The speed of operation of the shaft 6 may also be varied by a rheostat 10 which is operated by an adjusting member 11 for varying the speed of operation of the motor 7.

Referring to Fig. 6 there is shown an antenna 12 mounted on a rotatable support 13 which is driven by a gear 14 in meshing engagement with a pinion 15 which, in turn, is driven by a motor 16. Operation of the motor 16 is controlled by varying the voltage across its armature, and to this end the motor 16 has its armature connected in series with the armature of a constant speed generator 17 having a variable control field 18, A generator 19 provides excitation for the field 18 under the control of a variable resistance device indicated as a whole by the numeral 20. The variable resistance 20 comprises a pair of like resistances 21 and 22, each of which have connected thereto at spaced points a plurality of flexible conductor leaves 23 having silver contact buttons 24 at their outer ends. It is to be understood that the showing of the resistance element 20 is merely diagrammatic and that a greater number of flexible conductor leaves 23 are employed in actual practice. In the position shown, the resistances 21 and 22 are equal and balanced, and no current flows through the field winding 18. Upon movement of an actuating member 25 in one direction or the other, contact buttons 24 will be engaged to shunt out a portion of either the resistance 21 or the resistance 22. This unbalances the circuit for the control field winding 18, and is effective to vary the amount of current flowing therethrough according to the amount of resistance shunted out, and to vary the direction of current flow according to which of the resistances 21 or 22 is operated.

Control of the variable resistance unit 20 is effected through a gyroscope 26 which is mounted for rotation about the axis of a shaft 27 and has an axis of spin at right angles to the axis of the shaft 27 and in the plane of Fig. 6. The gyroscope 26 is of the neutral type and is pivoted at 28 for precessional movement about an axis perpendicular to its axis of spin.

The shaft 27 is connected to the rotor of a differential synchro-tie 29 which is selectively connected intermediate the transmitter synchro-tie 5 and a receiver synchro-tie 30. The transmitter synchro-tie 30 is provided with a worm gear connection 31 to the antenna drive motor 16, in order that its position will be controlled by and represent the position of the antenna 12.

Upon displacement of either the synchro-tie element 5 or 30 with respect to each other, the differential element 29 will function to rotate the shaft 27, and thereby the gyroscope 26, and move its axis of spin out of the plane of Fig. 6. The actuating element 25 is eccentric with respect to the axis of the shaft 27, and thereby is effective to actuate the resistance 20 an amount proportional to the amount of displacement between the elements 5 and 30. Movement of the axis of spin of the gyroscope 26 will cause precessional movement of the gyroscope 26 about its precessional axis 28 an amount proportional to the velocity of movement imparted to the gyroscope 26. This precessional movement will operate the member 25 to effect a further actuation of the variable resistance 20. The displacement response provided by rotation of the shaft 27 and the velocity response provided by precessional movement of the gyroscope 26 cooperate together through the control 20, generator 17 and motor 16 to drive the antenna 12 in the proper direction at a speed sufficient to remove the displacement between the synchro-tie elements 5 and 30. The structure of the gyroscope 26 and the manner in which it cooperates with the variable resistance 20 form no part per se of this invention, such structure and its function being set forth in more detail in the above-mentioned copending application and in the copending application of C. R. Hanna et al., Serial No. 412,612, filed September 27, 1941, now Patent No. 2,385,203, granted September 18, 1945.

The position of the transmitter synchro-tie 5 is under the control of a shaft 32 connected to the cage 33 of a differential gear, one side 34 of which is connected to the manually operable control element 4, and the other side 35 of which is connected to a power driven gear 36. In Fig. 6, the gear 36 is shown as driven by gearing 37 operated directly by the motor 7. The motor 7 has a variable voltage control provided by the manually operable rheostat 10—11, and thus provides a wide speed range of operation for the gear 36. It is to be understood that the showing of the gearing 37 in Fig. 6 is diagrammatic, and that in the preferred construction the drive for the shaft 6 from the motor 7 is through a speed change transmission, such as the transmission 8 shown in Fig. 2. The speed change transmission 8 will provide a plurality of different gear ratios over the speed range of the motor 7.

In the event it is desired to operate the transmitter synchro-tie 5 directly by the manually operable control 4, the motor 7 is deenergized, and the friction of the gearing connected to the differential gear 35 will be effected to hold such gear stationary. Movement of the cage 33, shaft 32 and transmitter synchro-tie 5 will then represent movement of the manually operable control element 4. In the event that it is desired to operate the transmitter synchro-tie 5 by the motor 7, it is necessary to prevent movement of the manually operable element 4 and the gear 34 connected thereto. For this purpose, a clamping device generally designated by the numeral 38 in Figs. 1 and 2 may be operated to engage the dial 4 to prevent movement thereof. Rotation of the cage 33, shaft 32 and transmitter synchro-tie 5 will then be effected only by operation of the motor 7.

A switch 39 is provided for connecting the armature 7 directly to the rheostat 10—11, or for connecting the motor 7 to such rheostat through reversing mechanism indicated as a whole by the numeral 40. When the switch 39 is thrown to the right, as viewed in Fig. 6, the armature circuit of the motor 7 will be connected directly to the rheostat 10—11. When the switch 39 is thrown to the left, as viewed in Fig. 6, the rheostat 10—11 will be connected to the reversing switch 40, and limit switch means indicated as a whole by the numeral 41 will be rendered operative to control a relay 42 which effects actuation of the reversing switch 40. The limit switch means 41 comprises separate micro-switches 43 and 44 adapted to be operated by an operating member 45. The operating member 45 is actuated by stops 46 and 47 which are connected to the receiver synchro-tie 3 for movement therewith. As pointed out above in connection with Figs. 1 and 2, the receiver synchro-tie 3 has its armature directly connected to the indicating dial 2. The receiver synchro-tie 3 as shown in Fig. 6 is electrically connected to a transmitter synchro-tie 48 which has a 1:1 gear ratio through the gears 49, 15 and 14 connecting the same to the antenna 12. In this manner, rotation of the receiver synchro-tie 3 will represent the rotation of the antenna 12, and the dial 2 will indicate the angular position in space of the antenna 12.

Figure 3:
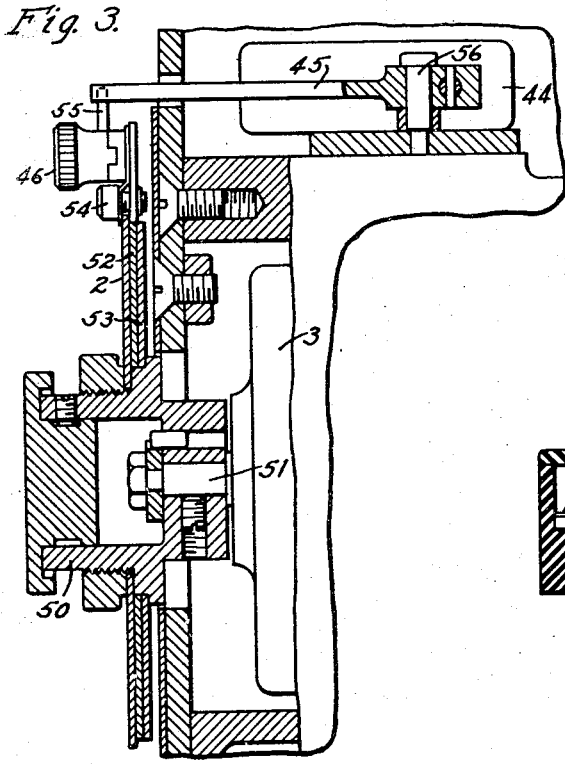
Fig. 3 is a vertical sectional view showing the parts by which the size and location of the sector being swept may be varied.

As best shown in Figs. 1 and 3, the indicating dial 2 is directly connected to a hub member 50 which is, in turn, secured to the armature shaft 51 of the receiver synchro-tie 3. The stop members 46 and 47 are respectively mounted on discs 52 and 53 which are rotatably mounted on the hub 50 carrying the indicating dial 2. Each of the discs 52 and 53, and the stops 46 and 47 respectively carried thereby, is provided with identhe position of said support for operating said reversing switch as the antenna moves to either end of a given arc to thereby continuously move said support back and forth through said arc.

3. In a drive for a directional antenna, a rotatable support for the antenna, drive means for said support, control means for said drive means including a remotely positioned control member and a follow-up system for effecting rotation of said support in accordance with movement of said control member, an electric motor for driving said member, an electric circuit for said motor including a reversing switch for reversing the operation thereof, means responsive to the position of said support for operating said reversing switch as the support moves to either end of a given arc to thereby continuously move said support back and forth through said arc, and means for adjusting said responsive means to vary either or both the magnitude and position in azimuth of the sector being swept by the support.

4. In a drive for a directional antenna, a rotatable support for the antenna, drive means for said support, control means for said drive means including a remotely positioned control member and a follow-up system for effecting rotation of said support in accordance with movement of said control member, an electric motor for driving said member, an electric circuit for said motor including a reversing switch for reversing the operation thereof, a pair of limit switches for operating said reversing switch, and operating means comprising a pair of members movable in an annular path in response to rotation of said support and spaced from each other along said path, each of said limit switches being operable by one of said members so that the support will be moved back and forth angularly to sweep a sector in azimuth determined by the spacing of said members.

5. In a drive for a directional antenna, a rotatable support for the antenna, drive means for said support, control means for said drive means including a remotely positioned control member and a follow-up system for effecting rotation of said support in accordance with movement of said control member, an electric motor for driving said member, an electric circuit for said motor including a reversing switch for reversing the operation thereof, limit switch means for operating said reversing switch, an operating means for said limit switch means comprising an indicating dial located remotely from said antenna and rotatable therewith to indicate its position, a pair of stop members mounted on said dial and movable thereby in an annular path, and an actuating member for said limit switch means in the path of movement of said stop members, said actuating and stop members cooperating to reverse said motor for continuously moving said support back and forth through a sector determined by the angular distance between said stop members.

6. A drive as claimed in claim 5 wherein said stop members are adjustably mounted on said dial for movement to different positions for varying the sector being swept by said support.

7. In a drive for a directional antenna, a rotatable support for the antenna, drive means for said support, control means for said drive means including a remotely positioned control member, a differential synchro-tie system operatively connected to said control member and to said support and having an element movable in accordance with the displacement between said control member and the support, and means responsive to movement of said element for effecting regulation of said drive means proportional to the amount of displacement between said control member and the support and proportional to the velocity at which such displacement is taking place, a reversible electric motor for driving said control member including a reversing switch for reversing the operation thereof, and means responsive to the position of the support for operating said reversing switch as the support moves to either end of a given arc to thereby continuously move said support back and forth through said arc.

8. In a drive for a directional antenna, a rotatable support for the antenna, a reversible electric motor for driving said support, means including a rotary controlling member for controlling the motor to drive the support in a follow-up manner with respect to the controlling member, a controlling motor, means for transmitting motion from the controlling motor to the controlling member, and means automatically operable to reverse the operation of said controlling motor as said support moves to either end of a given arc to effect continuous movement of said support back and forth to sweep a given sector in azimuth.

9. In a drive for a directional antenna, a rotatable support for the antenna, a reversible electric motor for driving said support, means including a rotary controlling member for controlling the motor to drive the support in a follow-up manner with respect to the controlling member, a controlling motor, means for transmitting motion from the controlling motor to the controlling member, means automatically operable to reverse the operation of said controlling motor as said support moves to either end of a given arc to effect continuous movement of said support back and forth to sweep a given sector in azimuth, said motion-transmitting means between the controlling motor and the controlling member including speed changing means operable to vary the speed of movement of the controlling member in relation to the controlling motor to provide for variation in the sweeping speed of said support.

10. In a drive for a directional antenna, a rotatable support for the antenna, a reversible electric motor for driving said support, means including a rotary controlling member for controlling the motor to drive the support in a follow-up manner with respect to the controlling member, a controlling motor, means for transmitting motion from the controlling motor to the controlling member, means automatically operable to reverse the operation of the controlling motor as said support moves to either end of the given arc to effect continuous movement of said support back and forth to sweep a given sector in azimuth, and means providing for adjustment of said automatic means to vary either or both the magnitude and position in azimuth of the sector being swept.

11. In a drive for a directional antenna, a rotatable support for the antenna, a reversible electric motor for driving said support, means including a rotary controlling member for controlling the motor to drive the support in a follow-up manner with respect to the controlling member, a controlling motor, means for transmitting motion from the controlling motor to the controlling member, means automatically operable to reverse the operation of said controlling motor as said support moves to either end of a given arc to effect continuous movement of said support back and forth to sweep a given sector in azimuth, and adjustable means for adjusting tical means for clamping the same in fixed position with respect to the indicating dial 2. As shown for the disc 52 and stop 46 in Fig. 3, a threaded fastening device 54 is provided for clamping the discs 52 to the indicating dial 2. A similar fastening device 54 is provided for clamping the disc 53 to the dial 2 as shown in Fig. 1. In this manner, the positions of the stops 46 and 47 may be adjustably secured along the peripheral edge of the indicating dial 2 for a purpose to be described.

Figure 4:
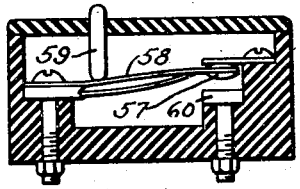
Fig. 4 is a sectional view diagrammatically illustrating the construction of one of a pair of limit switches employed in connection with the apparatus shown in Fig. 4.

Each of the stops 46 and 47 is provided with an upwardly projecting actuating member 55 which is movable in an annular path upon rotation of the dial 2. As best shown in Fig. 3, the actuating member 45 projects outwardly through the casing 1 into the path of the actuating members 55. A pivot 56 is provided for the actuating member 45, and such member will be pivoted counter-clockwise to actuate the limit switch 44 upon engagement of the stop 46 therewith, and will be actuated clockwise to operate the limit switch 43 upon engagement of the stop 47 therewith as will be best understood from the diagrammatic showing of Fig. 6. Each of the limit switches 43 and 44 are of a type well known in the art and commonly referred to as "micro-switches." The construction of such switches is diagrammatically shown in Fig. 4. In this showing, a movable contact 57 is carried by a snap-acting spring member 58 under the control of an operating plunger 59. Upon a very small downward movement of the operating member 59 as viewed in Fig. 4, the spring member 58 will be flexed downwardly and operate to snap the contact 57 into engagement with a stationary contact 60. In this manner, a very slight force and movement applied to the plunger 59 will be effective to operate the switch. It is to be understood that a pair of such switches are preferably employed and mounted in such manner that an actuating member 59 is positioned on opposite sides of the member 45 as diagrammatically shown in Fig. 6.

Figure 5:
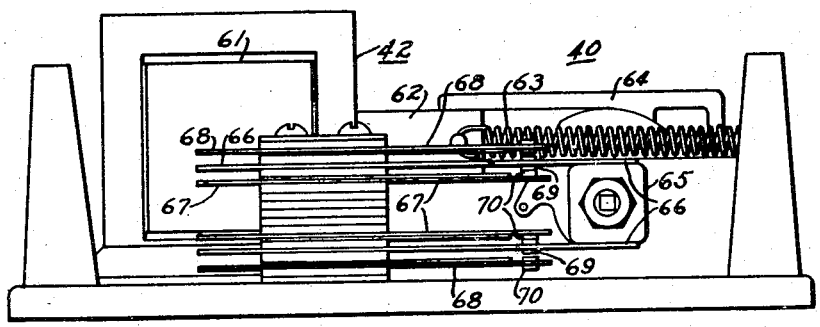
Fig. 5 is a side elevational view of a relay and reversing switch operated thereby.

Operation of either limit switch 43 or 44 is effective to energize the coil 61 of relay 42. As shown in Fig. 5, the relay 42 comprises the coil 61, an armature 62, a spring 63 biasing the armature 62 to a limited position with respect to the coil 61, a ratchet operating mechanism 64 connected to the armature 62, and a contact actuating member 65 for the reversing switch indicated as a whole by the numeral 40. The reversing switch comprises a pair of flexible conductor leaves 66 engageable with the actuating member 65 and inner and outer flexible leaves 67 and 68 associated with each of the leaves 66. The conductor leaves 66 are provided with movable contacts 69 adapted to electrically engage stationary contacts 70 on the leaves 67 and 68 in a manner to be described.

As will be best understood from Fig. 6, each operation of the relay 61 is adapted to rotate the ratchet mechanism 64 through an angle of 45°. When the actuating member 65 is in the position shown with the resilient leaves 66 in engagement with the flat sides of the actuating member 65, the movable contact 69 carried by the leaves 66 will engage with the stationary contacts 70 carried by the inner flexible leaves 67 as shown in Fig. 5. This will connect the motor 7 to the rheostat 10—11 in one direction. Upon subsequent energization of the relay 42, the ratchet mechanism 64 will be rotated through an angle of 45°. This action will move the corners of the actuating members 65 into engagement with the leaves 66 and cause such leaves to move outwardly to engage the movable contacts 69 carried thereby with the stationary contacts 70 carried by the outer flexible leaves 68. As will be best understood from the circuit diagram in Fig. 6, such action will reverse the direction of current flowing through the armature 7.

With the control switch 39 thrown to the left, the operation of the reversing mechanism for the motor 7 is as follows. The motor 7 will operate first to effect rotation of the antenna 12 in one direction by the driving mechanism described above. Assuming this direction to be clockwise, then the receiver synchro-tie 3 will be rotated clockwise until stop 46, or actuating member 55 carried thereby, engages the limit switch operating member 45. This will operate the limit switch 44, and the relay 42 will be energized to move the leaves 66 into electrical engagement with the outer contact carrying leaves 68, and thus reverse the direction of current flow through the motor 7 and its direction of rotation to effect rotation of the antenna 12 in an opposite direction, that is, a counterclockwise direction. In response to such movement of the antenna 12, the receiver synchro-tie 3 will be rotated in a counterclockwise direction until the stop 47 engages the limit switch actuating member 45. Such engagement will effect operation of the limit switch 43 and a further operation of the relay 42 to return the flexible leaves 66 to the position shown in Fig. 6 in electrical engagement with the inner leaves 67. The rotation of the motor 7 will thus again be reversed to start the cycle of operations just described all over again.

From the foregoing, it will be apparent that there is provided mechanism for automatically moving a rotatable antenna back and forth over a given arcuate path to automatically sweep a given sector in azimuth. It will be further apparent that the adjustable stop members 46 and 47 provide means for adjusting the position and size of such sector, that is, the location and size of the arc through which the antenna 12 moves angularly back and forth. By noting the positions of the stop members 46 and 47 on the dial 2, an operator can readily tell the sector being swept by a remotely located antenna. In addition, it will be noted that the rheostat 10—11 and the speed transmission 8 provide mechanism by which the speed of automatic sweeping may be readily controlled.

I claim as my invention:

1. In a drive for a directional antenna, a rotatable support for the antenna, drive means for said support, control means for said drive means including a remotely positioned control member and a follow-up system for effecting rotation of said support in accordance with movement of said control member, a reversible drive for said control member, and means responsive to the position of said support for reversing said control member drive as the support moves to either end of a given arc to thereby continuously move said support back and forth through said arc.

2. In a drive for a directional antenna, a rotatable support for the antenna, drive means for said support, control means for said drive means including a remotely positioned control member and a follow-up system for effecting rotation of said support in accordance with movement of said control member, an electric motor for driving said control member, an electric circuit for said motor including a reversing switch for reversing the operation thereof, and means responsive to said automatic means to vary either or both the magnitude and the position in azimuth of the sector being swept, said means for transmitting motion from the controlling motor to the controlling member including speed changing means operable to vary the speed of the controlling member in relation to that of the controlling motor to provide for variation in sweeping speed of said support.

12. In a drive for a directional antenna, a rotatable support for the antenna, an electric motor for driving the support, means including a rotary controlling member for controlling the motor to drive the support in a follow-up manner with respect to the controlling member, a controlling motor, means for transmitting motion from the controlling motor to the controlling member, means including a reversing switch for supplying electrical energy to the controlling motor so as to operate the latter in opposite directions, limit switch means for operating said reversing switch, and means responsive to the position of said support for operating said limit switch means as the support moves to either end of a given arc to thereby continuously move said support back and forth through said arc.

13. In a drive for a directional antenna, a rotatable support for the antenna, an electric motor for driving the support, means including a rotary controlling member for controlling the motor to drive the support in a follow-up manner with respect to the controlling member, a controlling motor, means for transmitting motion from the controlling motor to the controlling member, a reversing switch for the controlling motor, limit switch means for operating said reversing switch, means responsive to the position of said support for operating said limit switch means as the support moves to either end of a given arc to thereby continuously move said support back and forth through said arc, and means including a rheostat for supplying electrical energy directly to the controlling motor or through the reversing switch to the latter.

14. In a drive for a directional antenna, a rotatable support for the antenna, an electric motor for driving the support, means including a rotary controlling member for controlling the motor to drive the support in a follow-up manner with respect to the controlling member, a controlling motor, means for transmitting motion from the controlling motor to the controlling member, an electric circuit for said controlling motor including a reversing switch for reversing the operation thereof, limit switch means for operating said reversing switch, means responsive to the position of said support for operating said limit switch means as the support moves to either end of a given arc to thereby continuously move the support back and forth through said arc, and means for adjusting said responsive means to vary either or both the magnitude and position in azimuth of the sector being swept by the support.

15. In a drive for a directional antenna, a rotatable support for the antenna, an electric motor for driving the support, means including a rotary controlling member for controlling the motor to drive the support in a follow-up manner with respect to the controlling member, an electric circuit for said controlling motor including a reversing switch for reversing the operation thereof, a pair of limit switches for operating said reversing switch, and operating means for said limit switches comprising a pair of members movable in an annular path in response to rotation of said support and spaced from each other along said path, each of said limit switches being operable by one of said members so that the support will be moved back and forth angularly to sweep a sector in azimuth and whose magnitude is determined by the spacing of said members.

16. In a drive for a directional antenna, a rotatable support for the antenna, an electric motor for driving the support, means including a rotary controlling member for controlling the motor to drive the support in a follow-up manner with respect to the controlling member, a controlling motor, means for transmitting motion from the controlling motor to the controlling member, an electric circuit for said controlling motor including a reversing switch for reversing the operation thereof, a pair of limit switches for operating said reversing switch, operating means for said limit switches comprising a pair of members movable in an annular path in response to rotation of said support and spaced from each other along said path, each of said limit switches being operable by one of said members so that the support will be moved back and forth angularly to sweep a sector in azimuth having a magnitude determined by the spacing of said members, and means for adjustably mounting said members so that their positions along said annular path may be changed to vary the sector being swept by said support.

17. In a drive for a directional antenna, a rotatable support for the antenna, an electric motor for driving the support, means including a rotary controlling member for controlling the motor to drive the support in a follow-up manner with respect to the controlling member, a controlling motor, means for transmitting motion from the controlling motor to the controlling member, an electric circuit for said controlling motor including a reversing switch for reversing the operation thereof, limit switch means for operating said reversing switch, and operating means for said limit switch means comprising an indicating dial located remotely from said support and rotatable therewith to indicate its position, a pair of stop members mounted on said dial and movable thereby in an annular path, and an actuating member for said limit switch means in the path of movement of said stop members, said actuating and stop members cooperating to reverse said controlling motor to provide for movement of the support back and forth through a sector determined by the angular distance between said stop members.

18. The combination with a directional antenna support, a motor for driving the support, an angularly movable controlling member, means responsive to angular displacement of the controlling member and to the velocity of angular deviation of the controlling member relative to the support to control the input of energy medium to the motor to cause the support to follow the controlling member, a differential including a pair of input gears and output pinions meshing with the gears and carried by the controlling member, manual means for rotating one input gear, a controlling motor for operating the other input gear, and brake means operable to restrain rotation of the first input gear; of an element rotatable synchronously with said support, reversing means for the controlling motor including limit switches, means for operating the limit switches including stops carried by said element, and means providing for angular adjustment of each stop relative to the element and about the axis of the latter.

19. The combination with a directional antenna support, a motor for driving the support, an angularly movable controlling member, means responsive to angular displacement of the controlling member and to the velocity of angular deviation of the controlling member relative to the support to control the input of energy medium to the motor to cause the support to follow the controlling member, a differential including a pair of input gears and output pinions meshing with the gears and carried by the controlling member, manual means for rotating one input gear, a controlling motor for operating the other input gear, and brake means operable to restrain rotation of the first input gear: of a disc member rotatable synchronously with the support, a relay operable to effect reversing operation of the controlling motor, magnetic means for operating the relay, means for energizing the magnetic means including a pair of limit switches, means including stops carrried by the disc member for actuating the limit switches, and means providing for angular adjustment of each stop with respect to the axis of said member.

20. The combination with a directional antenna support, a motor for driving the support, an angularly movable controlling member, means responsive to angular displacement of the controlling member and to the velocity of angular deviation of the controlling member relative to the support to control the input of energy medium to the motor to cause the support to follow the controlling member, a differential including a pair of input gears and output pinions meshing with the gears and carried by the controlling member, manual means for rotating one input gear, a controlling motor for operating the other input gear, and brake means operable to restrain rotation of the first input gear: of a member rotatable synchronously with the support, a relay operable to effect reversing operation of the controlling motor, magnetic means for operating the relay, means for energizing the magnetic means including a pair of limit switches, means including stops carried by said member for actuating the limit switches, and means including a rheostat for supplying electrical energy directly to the controlling motor or through the reversing relay to the latter.

21. The combination with a directional antenna support, a motor for driving the support, an angularly movable controlling member, means responsive to angular displacement of the controlling member and to the velocity of angular deviation of the controlling member relative to the support to control the input of energy medium to the motor to cause the support to follow the controlling member, a differential including a pair of input gears and output pinions meshing with the gears and carried by the controlling member, manual means for rotating one input gear, a controlling motor for operating the other input gear, and brake means operable to restrain rotation of the first input gear: of a relay operable to reverse the controlling motor, magnetic means for operating the relay, means for energizing the magnetic means including a pair of limit switches, a disc member rotatable synchronously with the support, a pair of stops which are adjustable about the periphery of the disc member, an operating member for the limit switches and having a portion disposed between the stops so that it may be moved in one direction by one stop to close one limit switch and may be moved in the other direction by the other stop to close the other limit switch, and means including a rheostat for supplying electrical energy directly to the controlling motor or through the relay to the latter.

JOHN H. BROADBENT.

REFERENCES CITED

The following references are of record in the file of this patent:

UNITED STATES PATENTS

| Number | Name | Date |
| --- | --- | --- |
| 739,005 | Jackson | Sept. 15, 1903 |
| 764,439 | Eastwood | July 5, 1904 |
| 942,050 | Barnum | Dec. 7, 1909 |

FOREIGN PATENTS

| Number | Country | Date |
| --- | --- | --- |
| 498,992 | Germany | June 4, 1930 |